(12) United States Patent
Inoue et al.

(10) Patent No.: US 7,937,748 B2
(45) Date of Patent: May 3, 2011

(54) COMMUNICATION APPARATUS AND COMMUNICATION METHOD AND COMPUTER READABLE MEDIUM

(75) Inventors: Atsushi Inoue, Kawasaki (JP); Masahiro Ishiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1024 days.

(21) Appl. No.: 11/389,229

(22) Filed: Mar. 27, 2006

(65) Prior Publication Data

US 2006/0248583 A1  Nov. 2, 2006

(30) Foreign Application Priority Data

Apr. 27, 2005  (JP) .................................. 2005-130073

(51) Int. Cl.
*H04L 29/00* (2006.01)
(52) U.S. Cl. ........................................... 726/6; 713/181
(58) Field of Classification Search ................. 726/2–21; 713/155–159, 168–181
See application file for complete search history.

(56) References Cited

U.S. PATENT DOCUMENTS

| | | | | |
|---|---|---|---|---|
| 6,049,878 A | * | 4/2000 | Caronni et al. ................... | 726/3 |
| 6,101,543 A | * | 8/2000 | Alden et al. ................... | 709/229 |
| 6,275,933 B1 | * | 8/2001 | Fine et al. .......................... | 713/2 |
| 6,844,814 B2 | * | 1/2005 | Chin et al. ............... | 340/539.22 |
| 7,277,737 B1 | * | 10/2007 | Vollmer et al. ............... | 455/574 |
| 2001/0041591 A1 | * | 11/2001 | Carroll ........................... | 455/557 |
| 2003/0028804 A1 | * | 2/2003 | Noehring et al. ............. | 713/201 |
| 2003/0126233 A1 | * | 7/2003 | Bryers et al. ................... | 709/219 |
| 2004/0013099 A1 | * | 1/2004 | O'Neill ........................... | 370/338 |
| 2004/0068666 A1 | * | 4/2004 | Tosey ............................ | 713/201 |
| 2004/0103411 A1 | * | 5/2004 | Thayer .......................... | 717/171 |
| 2006/0205386 A1 | * | 9/2006 | Yu et al. ........................ | 455/411 |

FOREIGN PATENT DOCUMENTS

| | | |
|---|---|---|
| JP | 8-79269 | 3/1996 |
| JP | 9-247194 | 9/1997 |
| JP | 2000-112850 | 4/2000 |
| JP | 2002-199001 | 7/2002 |

OTHER PUBLICATIONS

Asada, "How a Tunnel is Constructed? : Getting to Know the System of IKE", Network magazine Aug. 2003, ASCII Corporation, Aug. 1, 2003, vol. 8, No. 8, pp. 46 to 49.

* cited by examiner

*Primary Examiner* — Nasser Moazzami
*Assistant Examiner* — Ghazal Shehni
(74) *Attorney, Agent, or Firm* — Oblon, Spivak, McClelland, Maier & Neustadt, L.L.P.

(57) ABSTRACT

A communication apparatus includes a storage device to store security associations to be exchanged between an opposite party's apparatus, an update device to update the security associations stored in the storage device, before starting a sleep mode for a power-saving operation, and a notification device to notify a message of updating of the security associations by the update device to the opposite party's communication apparatus.

3 Claims, 3 Drawing Sheets

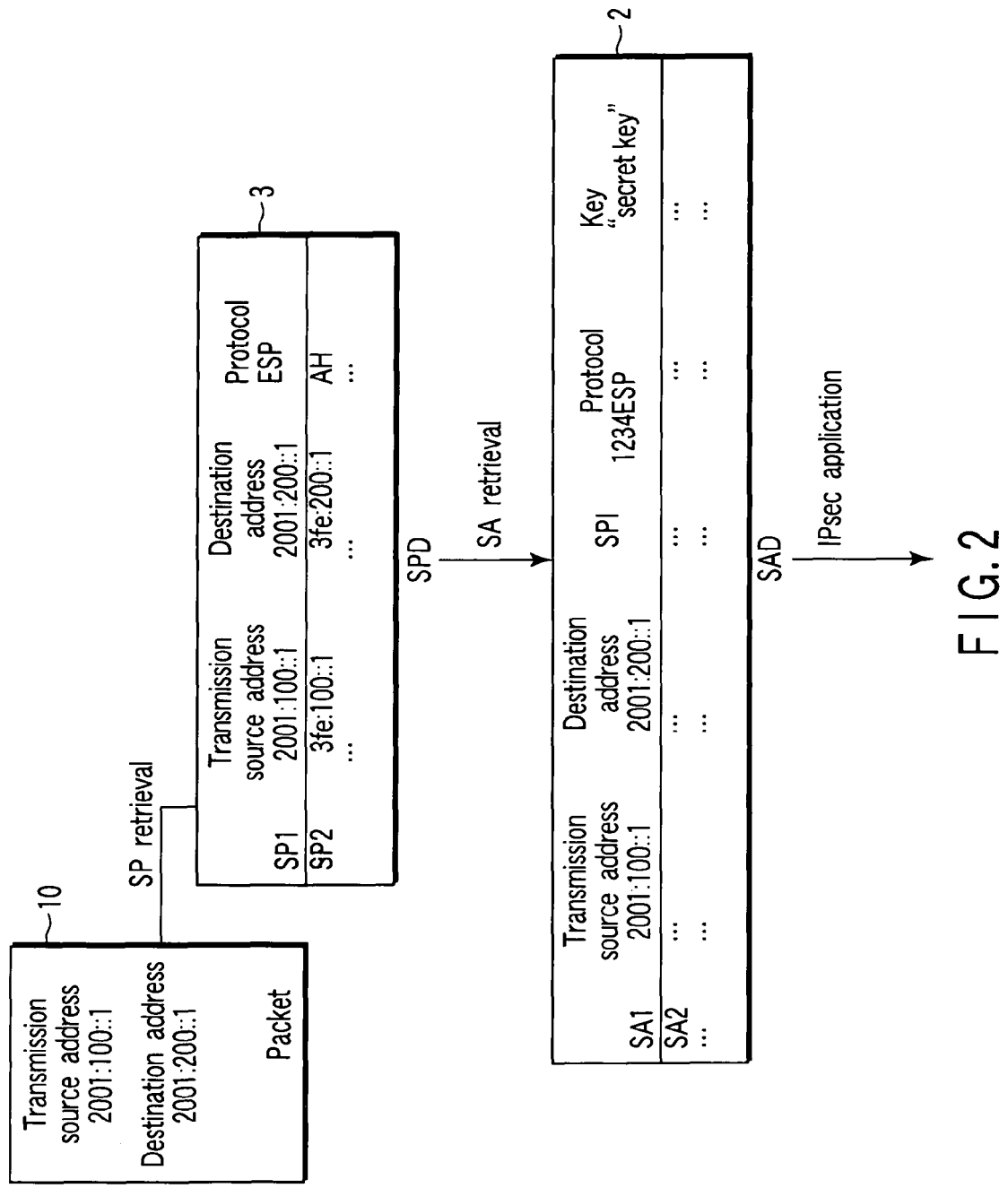
F I G. 2

COMMUNICATION APPARATUS AND COMMUNICATION METHOD AND COMPUTER READABLE MEDIUM

CROSS-REFERENCE TO RELATED APPLICATIONS

This application is based upon and claims the benefit of priority from prior Japanese Patent Application No. 2005-130073, filed Apr. 27, 2005, the entire contents of which are incorporated herein by reference.

BACKGROUND OF THE INVENTION

1. Field of the Invention

The present invention relates to a communication apparatus for setting security associations (SAs) between the apparatuses used by communication parties to make a secure communication such as IPsec by using a time-limited security parameter, and more particularly, to a communication apparatus with a power-saving operation mode.

2. Description of the Related Art

Control network technology used for a building automation (BA) network, a factory automation (FA) network and the like has been steadily developed alongside that of the Internet; however most of such technologies have been developed uniquely in response to conditions such as cost restrictions. Therefore, these control network technologies utilize technologies based on unique protocol layers that differ from those used by the Internet.

Since Internet technology is now widely used and has gained a position as a part of the social infrastructure, the control network technology has employed the Internet technology, such as a TCP and UDP, as a means for data transfer. For example, the control network technology includes a building automation and control network (BACnet) and a MODBUS TCP/IP as typical examples. These control network technologies are referred to as 'control network processed into the IP' henceforth.

Some control networks processed into the IP using technology called IPsec are proposed so as to secure security. The IPsec exchanges the SAs indicating related parameters such as encryption keys and authentication and encryption algorithms among communication apparatuses in advance, then starts communication. Each SA is a time-limited parameter to define a prescribed lifetime from the security point of view, and needs re-setting by initiating a key exchange protocol again after the elapse of the lifetime.

Some of the communication apparatuses composing the control network only communicate rarely. Constant energizing to prepare communications causes electricity to be needlessly consumed, so that some of the communication apparatuses have power-saving functions. When the power-saving functions are activated, operation modes of the communication apparatuses make shifts to sleep (resting or stand-by state) modes. The elapse of a fixed time period from start of sleep or wake-up resulting from an external trigger releases the sleep mode.

A communication apparatus with such a power-saving function causes the lifetime of the SA regarding the IPsec to be expired sometimes. In this case, the wake-up cannot bring the communication apparatus into communication. For re-setting of the SA, it is needed to restart the key exchange protocol, such as an Internet key exchange (IKE), to negotiate therewith because the re-setting of the SA requires a relatively long computing time. Therefore, a problem, such that the communication apparatus cannot immediately initiate a communication, occurs.

An apparatus to set's a communication parameter to terminals, etc., connected to a network is disclosed in Japanese Patent Application Publication (KOKAI) No. 2000-112850. This publication discloses a technology by which the communication apparatus can selectively specify a start-up mode for the terminals, etc., and control a transmission/reception of information based on a change of the communication parameter when there is no change in a network configuration, and it is sufficient for the apparatus to set initial values of the communication parameters to each terminal, etc.

BRIEF SUMMARY OF THE INVENTION

A communication apparatus according to one embodiment of the present invention comprises a storage device to store security associations (SAs) to be exchanged between an opposite party's communication apparatus; an update device configured to update the SAs stored in the storage device; and a notification device configured to notify a message that the SAs have been updated by the update device to the opposite party's communication apparatus.

BRIEF DESCRIPTION OF THE SEVERAL VIEWS OF THE DRAWING

FIG. 2 is an exemplary schematic diagram showing packet output processing of IPsec;

DETAILED DESCRIPTION OF THE INVENTION

Figure 1:
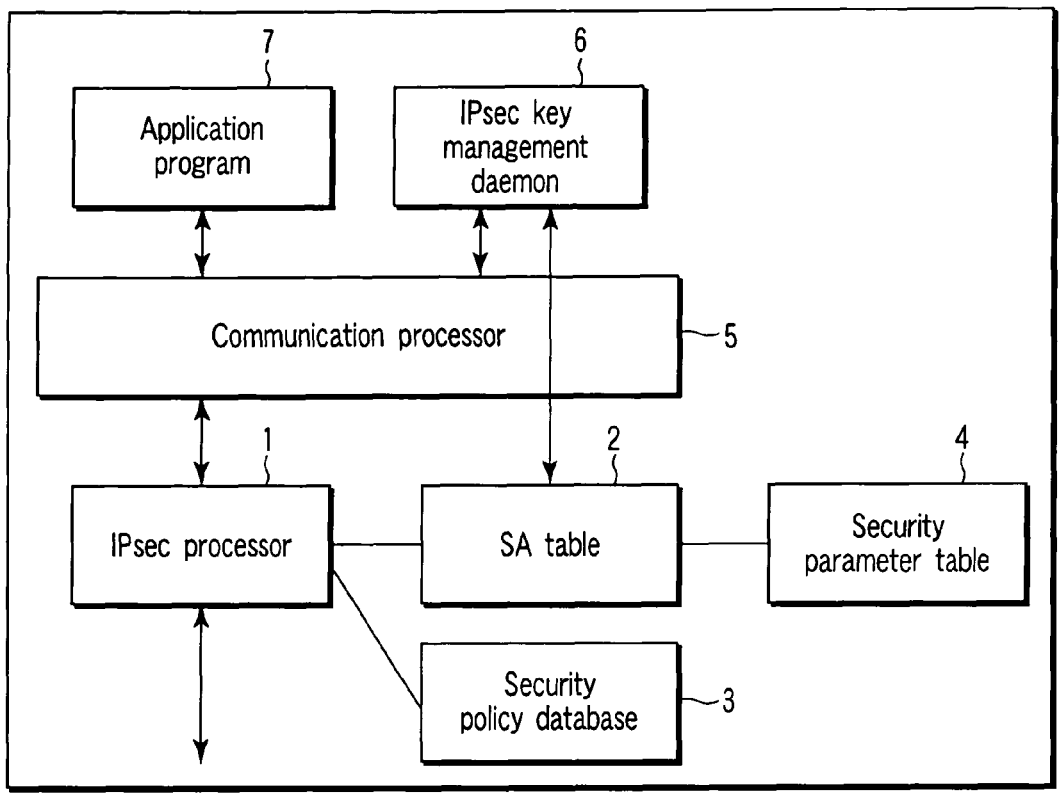
FIG. 1 is an exemplary block diagram showing a communication apparatus regarding an embodiment of the present invention.

Hereinafter, embodiments of the present invention will be described with reference to the drawings. FIG. 1 is an exemplary block diagram showing the communication apparatus regarding one embodiment of the present invention. The communication apparatus comprises a plurality of appliances (hereinafter referred to as communication nodes) disposed in a dispersed manner on a typical network such as a BA network and an FA network. Each communication node performs encrypted communications through the IPsec. Each communication node, as shown in FIG. 1, includes an IPsec processor 1, an SA table 2, an SPD 3 and a security parameter table 4.

A communication processor 5 consists of a computer having, for example, an MPU, a main storage device and a non-volatile storage device. The IPsec processor 1 is controlled from an application program 7 through the communication processor 5. The communication processor 5 has an IPsec key management daemon 6 to manage a key used in an IPsec communication, other than the application program 7.

The IPsec provides a service group on the security including an authentication and a concealment property (encryption) and is defined in the RFC 2401. The IPsec is executed in accordance with some protocols, such as an authentication header (AH), an encryption payload (ESP) and encrypted key management. The SA is the most basic parameter in the execution of the IPsec. "SA" refers to the relationship between two communication nodes to enable safe communications with each other, and describes a security service used by agreement with each other therein. The SA is uniquely specified by a security parameter index (SPI), a destination IP address, and a security protocol (AH or ESP). Each communication node holds an SA for each of an opposite party's node now in communication or an opposite party's node with which a communication has already been made. Lifetimes becoming invalid after the elapse of a prescribed time are set in each SA, respectively. To start communications in the IPsec among communication nodes, the SAs have to be exchanged among the communication nodes.

For a key exchange protocol used in the communications in the IPsec, a Kerberos-based KINK protocol may be used, and also the IKE may be used. In the embodiment of the present invention, it is assumed that the communication nodes perform IPsec communications via the Internet and use the IKE.

FIG. 2 is an exemplary schematic diagram showing the packet output processing in the IPsec. The IPsec processor 1 receives data to be transmitted from the application program 7 to construct a packet 10 then retrieves a security policy for transmitting the packet 10 from an SPD 3, based on the transmission source address and the destination address (SP retrieval). Next, the IPsec processor 1 retrieves the SA from the SA table 2 on the basis of the retrieval result of the security policy and of the transmission origin and destination addresses (SA retrieval) to obtain a key and a security parameter used for the IPsec communication. The use of the key and security parameter causes the IPsec to be applied to a transmission output of the packet to be transmitted.

Figure 3:
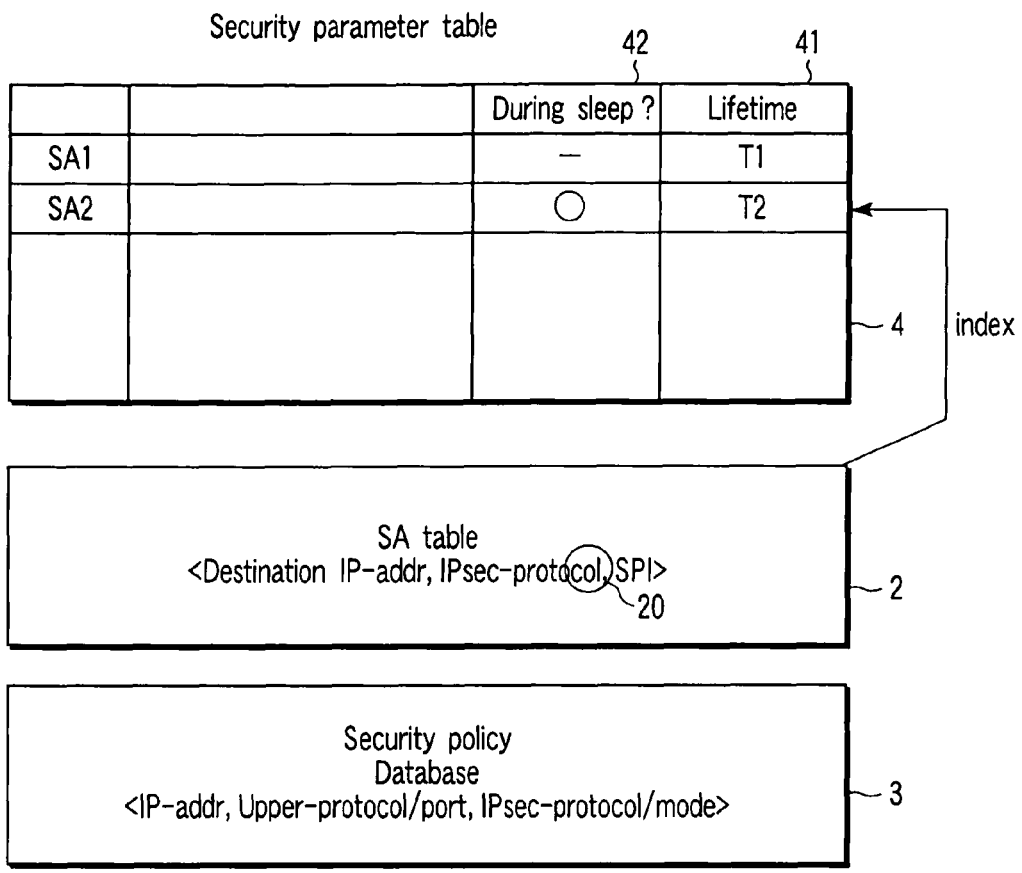
FIG. 3 is an exemplary view of a security association (SA) table, a security policy database (SPD) and a security parameter table.

FIG. 3 is an exemplary view showing the SA table, SPD and security parameter table. The SA table 2 stores entry of the SAs created at every communication with a communication opposite party's node. Each SA includes a destination address (destination IP-addr), a security protocol (IPsec-protocol) and SPI 20. The security protocol to be set in the SA corresponds to any one of several security protocols stored in the SPD 3 in advance. The SPI 20 specifies the security parameter corresponding to the SA through the security parameter table 4. The security parameter includes a field 41 to indicate the lifetime of the SA and a field 42 to indicate whether the communication opposite party's node is in the sleep mode or not. When the communication opposite party's node is in the sleep mode, a value to indicate the fact is set in the field 42.

The communication processor 5 has a power-saving operation mode to bring the communication node into the sleep mode by temporarily cutting off power to the communication processor 5, and to release the sleep mode by waking up the communication node, and has a normal operation mode that does not conduct such power-saving operation. When shifting to the power-saving operation mode to bring the communication node into the sleep mode, it is necessary for the communication processor 5 to remove the parameter related to the SA at that time point to store and hold it in the non-volatile storage device.

Here, the sleep mode of the communication node includes, for example, two types of modes in relation to the wake-up method:

Sleep mode 1: Waking up after the elapse of a scheduled sleep time. In this case, the sleep time can be estimated;

Sleep mode 2: Having received a trap by a packet from an unspecified opposite party's node, then, waking up by a wake on packet. In this case, the sleep time cannot be estimated.

In a communication node repeating sleep and wake-up in the power-saving operation mode, in the case where a communication uses a time-limited parameter such as the SA, it is preferable for the communication node to be able to start the communication immediately after the wake-up. Therefore, the communication node regarding the embodiment of the present invention controls update of the SA or the setting of its lifetime for the start of the sleep mode in a manner mentioned below. The following control examples differ from each other depending on differences of the aforementioned sleep modes.

[First Method: Sleep after Updating SA]

Figure 4:
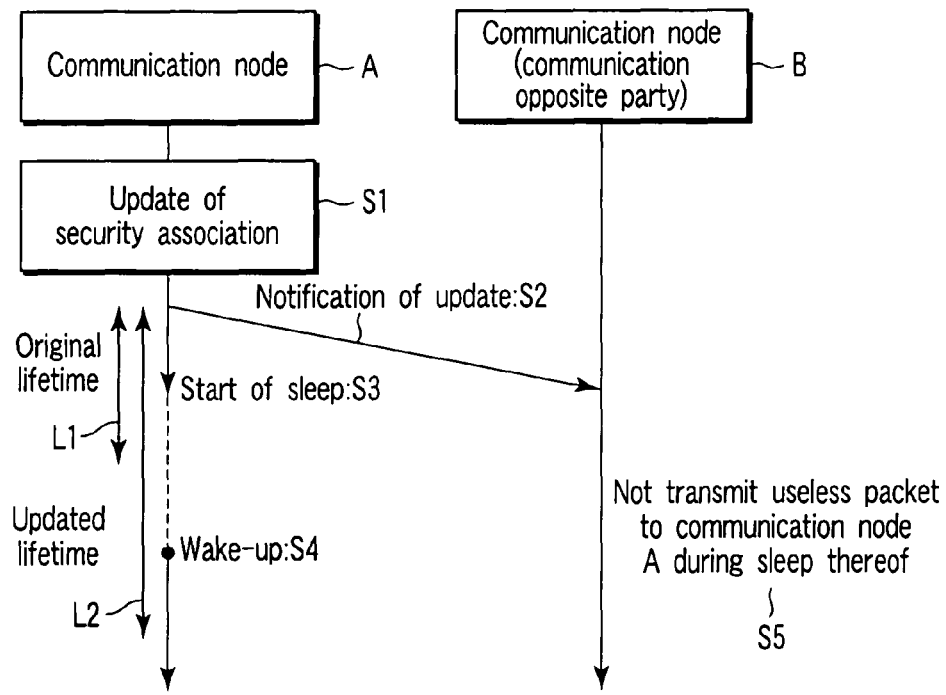
FIG. 4 is an exemplary sequence chart of operation procedures from starting of a sleep mode of a communication node A to wake-up thereof during a communication between the communication node A and a communication node B to operate the communication node A and the communication node B in accordance with a first method.

FIG. 4 is an exemplary sequence chart of the operation procedures from starting of the sleep mode of the communication node A to the wake-up thereof during the communication between the communication node A and the communication node B to operate the communication node A and the communication node B in accordance with a first method. The first method updates the parameters such as the SA to the most recent one in a step S1 just before the start of the sleep of the communication node A. This update causes a new lifetime to be set to the newly updated SA. In step 2, the communication node A communicates the fact that the SA has been updated with the communication node B being a communication opposite party.

If the SA of the communication node A still has an original lifetime L'si before it is updated, as shown in FIG. 4, a case is considered, in which the communication node A cannot start communications immediately because the lifetime L comes to an end within a time period from a step S3 at which the communication node A starts the sleep to a step S4 at which the communication node A wakes up, and it becomes necessary for the SA to be updated. On the contrary, in the case of the first method by which the SA has been updated before being brought into the sleep, since the lifetime is updated in advance within a time from the start of the sleep of the communication node A at the time point of the step S3 to the wake-up of the communication node A at the time point of the step S4, the communication node A has a time longer than the original lifetime L1. Accordingly, the communication node A can use the SA as it is without updating after the wake-up at the step S4 and immediately start communications by avoiding the parameters from being refreshed. This first method is appropriate for the communication node having a relatively short sleep time.

(Processing on Communication Opposite Party's Side)

When a new lifetime is fixed by updating the SA on the side of the communication node A, the communication node A notifies the fact to the communication node B being the communication opposite party at the step S2. At this moment, the communication node B puts a mark to the entry of the corresponding SA table 2. For the marked SA entry, a packet transmission for communication management such as key update and dead peer detection (DPD) of the IPsec is stopped for a fixed time period (S5). Thereby, the communication node B performs the packet transmission and can prevent the communication node A now in the sleep from being woken up due to a careless packet being set to the communication node A.

[Second Method: in the Case of Sleep Mode 1]

Figure 5:
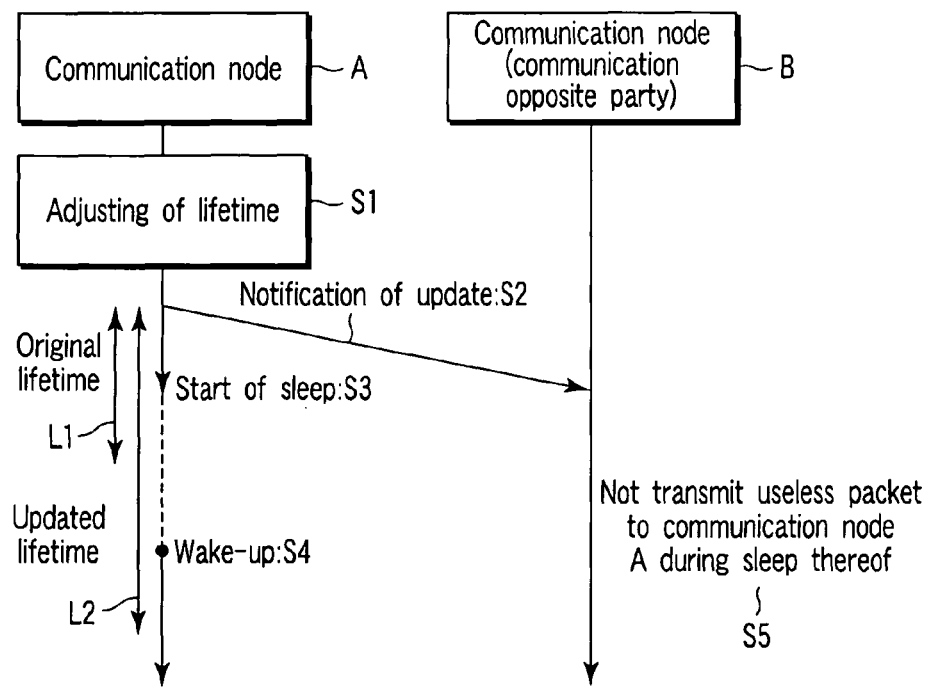
FIG. 5 is an exemplary sequence chart of operation procedures from starting of a sleep mode of a communication node A to wake-up thereof during a communication between the communication node A and a communication node B to operate the communication node A and the communication node B in accordance with a second method.

FIG. 5 is the exemplary sequence chart of the operation procedures after starting of the sleep mode of the communication node A up to the wake-up thereof during the communication between the communication node A and the communication node B to operate the communication node A and the communication node B in accordance with a second method. The second method adjusts a value of the lifetime of the SA in consideration of the sleep time in the step S1 just before the start of the sleep of the communication node A. Differing from the aforementioned first method, the communication node A does not update the SA itself. In the foregoing sleep mode 1, the sleep time can be estimated. Therefore, an adjusted lifetime L2 is obtained by adding a value of the estimated sleep time to the lifetime L1 of a current SA. In the step S2, the adjusted lifetime L2 is notified to the communication node B being the communication opposite party. The value of the adjusted lifetime L2 is set in the security parameter table 4 of the corresponding communication node A, and on the other hand, the value of the lifetime L2 is also set in the security parameter table 4 of the communication node B being the communication opposite party.

As can be understood from FIG. 5, it is conceivable for the original lifetime L1 without any adjustment not possible to immediately start communications because the lifetime L1 comes to an end within the time period from the time point in the step S3 at which the communication node A started the sleep to the time point in the step S4 at which the communication node A woke up, and it becomes necessary for the SA to be updated after the wake-up in the step S4. In contrast, in the case of the second method to adjust the lifetime of the SA before the sleep, since the lifetime is extended to be adjusted as the lifetime L2 within the time period from the time point in the step S3 at which the communication node A started the sleep to the time point in the step S4 at which the communication node A waked up, the communication node A has a time longer than the original lifetime L1. Therefore, the communication node A can immediately start communications by using the SA as it is without updating it after the wake-up in the step S4.

(Processing on Communication Opposite Party's Side)

If a lifetime after the adjustment on the communication node A side is fixed, as in the aforementioned first method, the communication node A notifies the fact to the communication node B being the communication opposite party in the step S2. At this moment, the communication node B adds a mark to the entry of the corresponding SA table 2. For the marked SA entry, a packet transmission for communication management such as key update and dead peer detection (DPD) of the IPsec is stopped for a fixed time period (S5). Thereby, the communication node B performs the packet transmission to the communication node A and can prevent the communication node A now in the sleep mode from being woken up due to a careless packet being set to the communication node A.

[Third Method: in the Case of Sleep Mode 2]

The third mode is the case where a sleep mode is the aforementioned sleep mode 2. In the sleep mode 2, the sleep time is not definitive and impossible to be estimated. In the third method, therefore, the communication node A updates the communication parameter such as the SA to the most recent one by using the foregoing first method and also adds a fixed time period to the lifetime depending on the log of previous communications to shift into the sleep mode. The fixed time period to be added to the lifetime may be computed from the log of the previous communications of the communication node A and also may be a value resulting from a type or attribute of the communication node A. For example, in the case of a sensor node of an air conditioner, the adding time period is set to 'thirty minutes'; however in the case of a rarely used node, the adding time period is set to 'one month'.

According to the embodiments of the present invention described above, when performing communications with the time-limited parameter related to the communications of the IPsec, etc., held therein and repeating the sleep and wake-up at any time to conduct the power-saving, each communication apparatus in the control network can avoid the reset of the time-limited parameter and start communications immediately after the wake-up. Accordingly, each communication apparatus can effectively utilize the power-saving operation mode of the communication node, and also can provide immediate communication, thus being applicable to a wider field by avoiding overheads of, for example, update of a communication parameter.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus, comprising:
a storage device to store security associations that are time-limited parameters regarding an IPsec secure communication, the security associations being exchanged between an opposite party's communication apparatus, and being effective during prescribed lifetimes;
an adjustment device configured to update the security associations stored in the storage device before starting a sleep mode for a power-saving operation, and to adjust the lifetimes for the updated security associations so that a longer time period is added to the lifetimes when it is determined based on a log of previous communications that the communication apparatus is rarely used, wherein the adjusted lifetimes for the updated security associations enable the communication apparatus to start communication immediately after a wake-up in the sleep mode; and
a notification device configured to notify the lifetimes, adjusted by the adjustment device, to the opposite party's communication apparatus to stop a transmission of a packet for communication management for a fixed time period in the opposite party's communication apparatus, the packet including a dead peer detection (DPD) packet.

2. A communication method, comprising:
exchanging security associations that are time-limited parameters regarding an IPsec secure communication, the security associations being exchanged between an opposite party's communication apparatus and having lifetimes;
storing the exchanged secure associations in a storage device;
updating the lifetimes of the security associations stored in the storage device before starting a sleep mode for a power-saving operation;
adjusting the lifetimes for the updated security associations so that a longer time period is added to the lifetimes when it is determined based on a log of previous communications that the communication apparatus is rarely used, the adjusted lifetimes for the updated security associations enabling start of communication immediately after a wake-up in the sleep mode; and notifying the adjusted lifetimes to the opposite party's apparatus to stop a transmission of a packet for communication management for a fixed time period in the opposite party's communication apparatus, the packet including a dead peer detection (DPD) packet.

3. A non-transitory computer readable medium storing a computer program for causing a computer to execute instructions according to a method comprising:

exchanging security associations that are time-limited parameters regarding an IPsec secure communication, the security associations being exchanged between an opposite party's communication apparatus and having lifetimes;

storing the exchanged secure associations in a storage device;

updating the lifetimes of the security associations stored in the storage device before starting a sleep mode for a power-saving operation;

adjusting the lifetimes for the updated security associations so that a longer time period is added to the lifetimes when it is determined based on a log of previous communications that the communication apparatus is rarely used, the adjusted lifetimes for the updated security associations enabling start of communication immediately after a wake-up in the sleep mode; and notifying the adjusted lifetimes to the opposite party's apparatus to stop a transmission of a packet for communication management for a fixed time period in the opposite party's communication apparatus, the packet including a dead peer detection (DPD) packet.

* * * * *